United States Patent
Ol et al.

(10) Patent No.: US 11,731,759 B2
(45) Date of Patent: Aug. 22, 2023

(54) SYSTEMS AND METHODS FOR YAW-TORQUE REDUCTION ON A MULTI-ROTOR AIRCRAFT

(71) Applicants: California Institute of Technology, Pasadena, CA (US); TooFon, Inc., Pasadena, CA (US)

(72) Inventors: Michael V. Ol, Pasadena, CA (US); Morteza Gharib, Altadena, CA (US); Amir Emadi, Pasadena, CA (US)

(73) Assignees: TOOFON, INC., Pasadena, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 17/648,381

(22) Filed: Jan. 19, 2022

(65) Prior Publication Data

US 2022/0227489 A1 Jul. 21, 2022

Related U.S. Application Data

(60) Provisional application No. 63/139,221, filed on Jan. 19, 2021.

(51) Int. Cl.
*B64C 27/82* (2006.01)
*B64C 27/32* (2006.01)

(52) U.S. Cl.
CPC .............. *B64C 27/82* (2013.01); *B64C 27/32* (2013.01); *B64C 2027/8227* (2013.01)

(58) Field of Classification Search
CPC .. B64C 27/32; B64C 27/82; B64C 2027/8227
See application file for complete search history.

(56) References Cited

U.S. PATENT DOCUMENTS

| 3,179,353 A | 4/1965 | Peterson |
| 4,880,071 A | 11/1989 | Tracy |

(Continued)

FOREIGN PATENT DOCUMENTS

| JP | 2002347698 A | 12/2002 |
| JP | 2019181965 A | 10/2019 |

(Continued)

OTHER PUBLICATIONS

International Search Report and Written Opinion for International Application No. PCT/US2022/071201, Search completed Jun. 27, 2022, dated Jun. 30, 2022, 12 Pgs.

(Continued)

*Primary Examiner* — Tye William Abell
(74) *Attorney, Agent, or Firm* — Pillsbury Winthrop Shaw Pittman LLP

(57) ABSTRACT

A system and method for controlling a multi-rotor aircraft that implements the unconventional use of different sized rotors. The different sized rotors than the main rotors tend to generate an unbalanced torque and pitch on the aircraft that effectively decouples the pitch and yaw control from the main rotors. The atypical design tends to lend itself to improved control capabilities and simplified control systems. Additional configurations implement the use of smaller thrust rotors that can be used to generate thrust as well as control yaw and thus counteract any remaining unbalanced torque from the odd auxiliary rotor.

19 Claims, 7 Drawing Sheets

(56) References Cited

U.S. PATENT DOCUMENTS

| | | | |
|---|---|---|---|
| 5,505,407 A | | 4/1996 | Chiapetta |
| 6,375,120 B1 | | 4/2002 | Wolnek |
| 6,467,726 B1 | * | 10/2002 | Hosoda .................. B64C 35/00 |
| | | | 74/423 |
| 7,267,300 B2 | * | 9/2007 | Heath .................... B64D 35/04 |
| | | | 244/12.3 |
| 7,364,114 B2 | | 4/2008 | Wobben |
| 7,857,254 B2 | | 12/2010 | Parks |
| 8,376,266 B2 | * | 2/2013 | Gemmati ............... B64C 27/22 |
| | | | 244/175 |
| 8,540,184 B2 | * | 9/2013 | Gemmati ............... B64C 27/26 |
| | | | 244/6 |
| 9,051,050 B2 | | 6/2015 | Achtelik et al. |
| 9,623,969 B2 | | 4/2017 | Nelson |
| 9,823,664 B2 | | 11/2017 | Krogh et al. |
| 9,975,624 B1 | | 5/2018 | Harvey |
| D870,638 S | | 12/2019 | Kuanliang et al. |
| 10,518,873 B2 | * | 12/2019 | Netzer .................... B64C 27/26 |
| 10,526,082 B2 | | 1/2020 | Su |
| 10,836,467 B2 | | 11/2020 | Klein et al. |
| 11,072,423 B1 | | 7/2021 | Robertson et al. |
| 11,305,873 B2 | | 4/2022 | Zhang et al. |
| 2006/0192046 A1 | | 8/2006 | Heath et al. |
| 2006/0226281 A1 | * | 10/2006 | Walton ................... B64C 27/20 |
| | | | 244/17.23 |
| 2013/0092799 A1 | * | 4/2013 | Tian ....................... B64C 39/10 |
| | | | 244/7 R |
| 2014/0263822 A1 | | 9/2014 | Malveaux |
| 2014/0312177 A1 | * | 10/2014 | Gaonjur ................. B64C 27/26 |
| | | | 244/7 A |
| 2015/0329204 A1 | | 11/2015 | Nelson |
| 2016/0009387 A1 | | 1/2016 | Kummer et al. |
| 2016/0101850 A1 | | 4/2016 | Lin |
| 2016/0207625 A1 | * | 7/2016 | Judas ....................... B64C 3/38 |
| 2017/0349272 A1 | | 12/2017 | Laurent et al. |
| 2018/0057163 A1 | | 3/2018 | Sababha et al. |
| 2018/0141652 A1 | * | 5/2018 | Deslypper ............. B64C 39/12 |
| 2018/0244377 A1 | | 8/2018 | Chan |
| 2019/0061933 A1 | | 2/2019 | Cappelleri et al. |
| 2019/0106206 A1 | | 4/2019 | Shi et al. |
| 2019/0369057 A1 | | 12/2019 | Mattar et al. |
| 2020/0017204 A1 | | 1/2020 | Lacy et al. |
| 2020/0269980 A1 | * | 8/2020 | Fink ...................... B64C 39/068 |
| 2021/0070431 A1 | * | 3/2021 | NakaMats .............. B64U 30/10 |
| 2021/0284333 A1 | | 9/2021 | Windisch |
| 2021/0371093 A1 | * | 12/2021 | NakaMats .............. B64U 10/13 |
| 2022/0185464 A1 | | 6/2022 | Gharib et al. |
| 2022/0227489 A1 | | 7/2022 | Ol |
| 2022/0297822 A1 | | 9/2022 | Ol et al. |

FOREIGN PATENT DOCUMENTS

| | | |
|---|---|---|
| JP | 2020033000 A | 3/2020 |
| JP | 2020131779 A | 8/2020 |
| KR | 20120060590 A | 6/2012 |
| KR | 101784372 B1 | 9/2017 |
| KR | 20180069594 A | 6/2018 |
| KR | 101884902 B1 | 8/2018 |
| WO | 2016089882 A1 | 6/2016 |
| WO | 2016164280 A1 | 10/2016 |
| WO | 2017081668 A1 | 5/2017 |
| WO | 2020191489 A1 | 10/2020 |
| WO | 2022125132 A1 | 6/2022 |
| WO | 2022159951 A1 | 7/2022 |
| WO | 2022198225 A1 | 9/2022 |

OTHER PUBLICATIONS

International Search Report and Written Opinion for International Application No. PCT/US2021/028467, Search completed Sep. 9, 2021, dated Sep. 10, 2021, 8 Pgs.

International Search Report and Written Opinion for International Application No. PCT/US2021/028483, Search completed Sep. 17, 2021, dated Sep. 17, 2021, 8 Pgs.

International Search Report and Written Opinion for International Application No. PCT/US2022/070255, Search completed May 10, 2022, dated May 10, 2022, 8 Pgs.

"EVTOLS transportation of the future?", Xplane.org, General Discussion, Jul. 28, 2017, Retrieved from the Internet https://forums.x-plane.org/index.php2/forums/topic/126735-evtols-transportation-of-the-future/&page=6.

"Must quadcopters have the same propeller sizes?", Aviation, Oct. 21, 2018, Retrieved from the Internet https://aviation.stackexchange.com/questions/56237/must-quadcopters-have-the-same-propeller-sizes.

"Why aren't there more manned quad copter designs?", Mavic Pilots, Mar. 10, 2017, Retrieved from the Internet https://mavicpilots.com/threads/why-arent-there-more-manned-quad-copter-designs.10077/page-2. 12 pgs.

Du, "Pentacopter build log", DYI Drones, Jul. 20, 2018, Retrieved from the Internet https://diydrones.com/profiles/blogs/pentacopter-build-log.

Lenski, "Design, Construction and Operation of a Pentacopter", Thesis, Luleå University of Technology, Department of Computer Science, Electrical and Space Engineering, Mar. 2017, 84 pgs.

Lillian, "A Bunnycopter and Pentacopter? MIT Lets You Create Whatever Drone You Want", Unmanned Aerial, Dec. 5, 2016, Retrieved from the Internet https://unmanned-aerial.com/a-bunnycopter-and-pentacopter-mit-lets-you-create-whatever-drone-you-want.

Mohamed et al., "Design and Control of Novel Tri-rotor UAV", IEE Proceedings of 2012 UKACC International Conference on Control, Sep. 3-5, 2012, DOI: 10.1109/CONTROL.2012.6334647.

Yumurtaci, B. "Help with Differential Thrust for a VTOL", ArduPilot, May 2020, Retrieved from the Internet https://discuss.ardupilot.org/t/help-with-differential-thrust-for-a-vtol/56029.

* cited by examiner

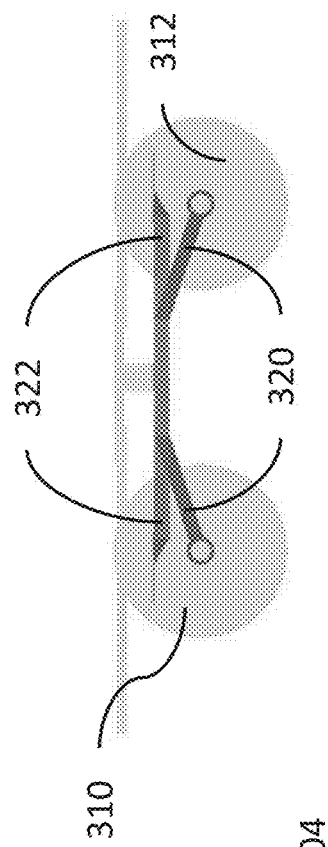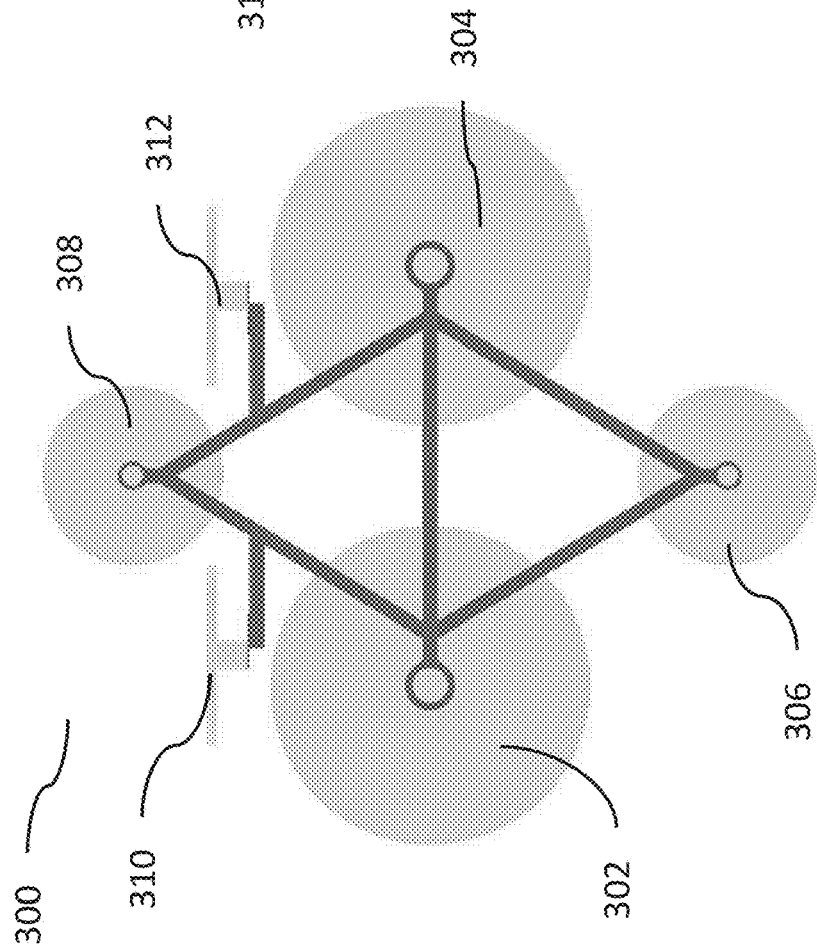

SYSTEMS AND METHODS FOR YAW-TORQUE REDUCTION ON A MULTI-ROTOR AIRCRAFT

CROSS-REFERENCED APPLICATIONS

This application claims priority to U.S. Provisional applications 63/139,221 filed on Jan. 19, 2021. The disclosures of which are included herein by reference in their entirety.

FIELD OF THE INVENTION

The present invention generally relates to multi-rotor aircraft. More specifically, it relates to the configuration and control of the various rotors in order to provide a stable and efficient control methodology.

BACKGROUND

Most Vertical Takeoff and Landing (VTOL) vehicles are multi-copter vehicles having a number of different rotors. Typical VTOL systems have multiple fixed-pitch rotors that work to produce the forces necessary for flight; which include lift, thrust, and side movement, as well as roll, pitch, and yaw. Traditionally, for a multi-rotor copter VTOL the rotors are similar to an airplane propeller and is configured in the horizontal plane. This configuration generally provides the lift force necessary to lift the aircraft into the air for flight. The configuration of rotors or propellers can also be used to provide thrust forces at speeds that are generally below those needed for a fixed winged aircraft, where the wing can provide lift when moving at higher speeds. The forward thrust in a VTOL is typically managed by the control or change in rotational speed (RPM) of the various rotors. This can be done by varying the speed of one or more rotors to drive the direction of the vehicle by changing the thrust generated by the rotors.

The vast majority of drones and VTOL tend to be a quad copter design with four rotors. This is largely due to the inherent stability that a quad copter offers. The balanced configuration of rotors combined with counter rotation of adjacent rotors can make for a very stable design. Additionally, small changes to the speeds of the rotors can allow for relatively precise vehicle control. For example, reducing speed on all four rotors can allow for a smooth decent. Likewise, changes in speed of the aft two rotors can cause forward flight and the opposite is true for change in the forward two rotors. Similarly, the moment controls of roll, pitch, and yaw can be adjusted through changing speeds in the various rotors. Accordingly, flight control systems can be largely simplified making the quad copter an easy, go to design for VTOL. However, many such traditional designs can create issues in scalability, especially when trying to manage the various movements and moments of the aircraft.

SUMMARY OF THE INVENTION

Many embodiments are directed to a multi-rotor vehicle that has an plurality of rotors disposed about a body of an aircraft. In many embodiments, there are an even number of main rotors that operate to provide lift for the vehicle and a secondary set of auxiliary rotors that have different diameters than that of the main lift rotors. The auxiliary rotors provide less lift than the main rotors. In various embodiments the unbalanced torque from the asymmetrical auxiliary rotors is counterbalanced from a pair of horizontal thrust rotors that are also configured to provide yaw control.

Various embodiments are directed towards a multi-rotor vehicle that has a main body structure and a plurality of main rotors connected to the body structure such that the main rotors are evenly disposed about a symmetry plane of the vehicle. The vehicle is also equipped with at least one set of auxiliary rotors connected to the body structure where one of the auxiliary rotors is disposed forward of the plurality of main rotors along the symmetry plane and where another one of the auxiliary rotors is disposed aft of the plurality of main rotors along the symmetry plane. Each rotor of the first set auxiliary rotors is configured to be smaller than each of the plurality of main rotors such that each of the rotors of the first set of auxiliary rotors are configured to control a pitch moment of the vehicle. Additionally, the vehicle can have two horizontal thrust rotors connected to the body and evenly positioned about the symmetry plane. The horizontal thrusters are configured to generate thrust in a forward direction such that a rotational plane of the thrust rotors is perpendicular to a rotational plane of the main rotors.

In other embodiments, the at least two horizontal thrust rotors can be used to affect a yaw moment in the vehicle through adjusting a rotational speed of each of the at least two horizontal thrust rotors.

In still other embodiments, the body structure is a plurality of elongated structural support elements and disposed such that at least one structural support element interconnects at least two main rotors and additional structural support elements interconnect the main rotors to the first set auxiliary rotors.

In yet other embodiments, the at least two thrust rotors are disposed on a first and second end of a transecting structural element, wherein the transecting structural support element transects at least two elongated structural support elements of the body structure.

In still yet other embodiments, the at least two thrust rotors are positioned aft of the main rotors.

In other embodiments, the plurality of main rotors is selected from a group consisting of 2, 4, and 6 rotors.

In still other embodiments, one of the first set auxiliary rotors is positioned such that a rotational space of the rotor overlaps a rotational space of the plurality of main rotors.

In yet other embodiments, the first set auxiliary rotors are asymmetrically disposed about a transverse plane such that one of the first set auxiliary rotors is disposed further from the main rotors than the other of the first set auxiliary rotors.

In still yet other embodiments, the shroud surrounds at least a portion of the main rotors and the auxiliary rotors of the vehicle.

In other embodiments, each of the main rotors, auxiliary rotor, and the at least two thrust rotors are selected from a group consisting of fixed pitch and variable pitch.

In still other embodiments, the vehicle has at least two dedicated yaw control rotors, where each of the at least two dedicated yaw control rotors are disposed beneath each of the at least two auxiliary rotors such that each of the dedicated yaw control rotors are configured to control a yaw moment of the vehicle.

In yet other embodiments, the vehicle has a second set of auxiliary rotors that are coaxially aligned with the first set of auxiliary rotors.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein:

FIGS. 3A and 3B illustrates a quad copter configuration with auxiliary rotors that are smaller than the main lifting rotors in accordance with embodiments.

DETAILED DESCRIPTION

Turning now to the drawings, systems and methods for improving flight control are illustrated. Many embodiments are directed to an aircraft that is designed with at least two heavy lift rotors that provide the majority of vertical thrust for the vehicle. The vehicle is additionally equipped with additional lift rotors that have different diameters, and thus different functions than the main vertical rotors. As can be appreciated, having rotors with different sizes poses unique control problems since the torque becomes unbalanced between the various rotors. As such, many embodiments can have rotors located more forward and/or aft of the main lifting rotors that provide additional lift, but can also be configured to help with pitch and roll of the aircraft. Additionally, many embodiments are equipped with a separate set of horizontal thrust rotors. By using separate horizontal thrust rotors elements of pitch and yaw can be decoupled from the main lifting rotors. This allows for a more simplified design and control system such that larger lifting rotors can be used and smaller rotors can be used for pitch and yaw that would require less energy to make large adjustments in flight.

As such, many embodiments may incorporate a smaller more forward positioned rotor that can alleviate the pitching moment on the vehicle while providing additional lifting properties. Additionally, many embodiments incorporate two or more thrust rotors positioned at a 90-degree angle from the main lifting rotors where the thrust rotors are configured to provide forward thrust to the vehicle. Additionally, the thrust rotors can function to provide improved yaw control in the vehicle.

Figure 1:
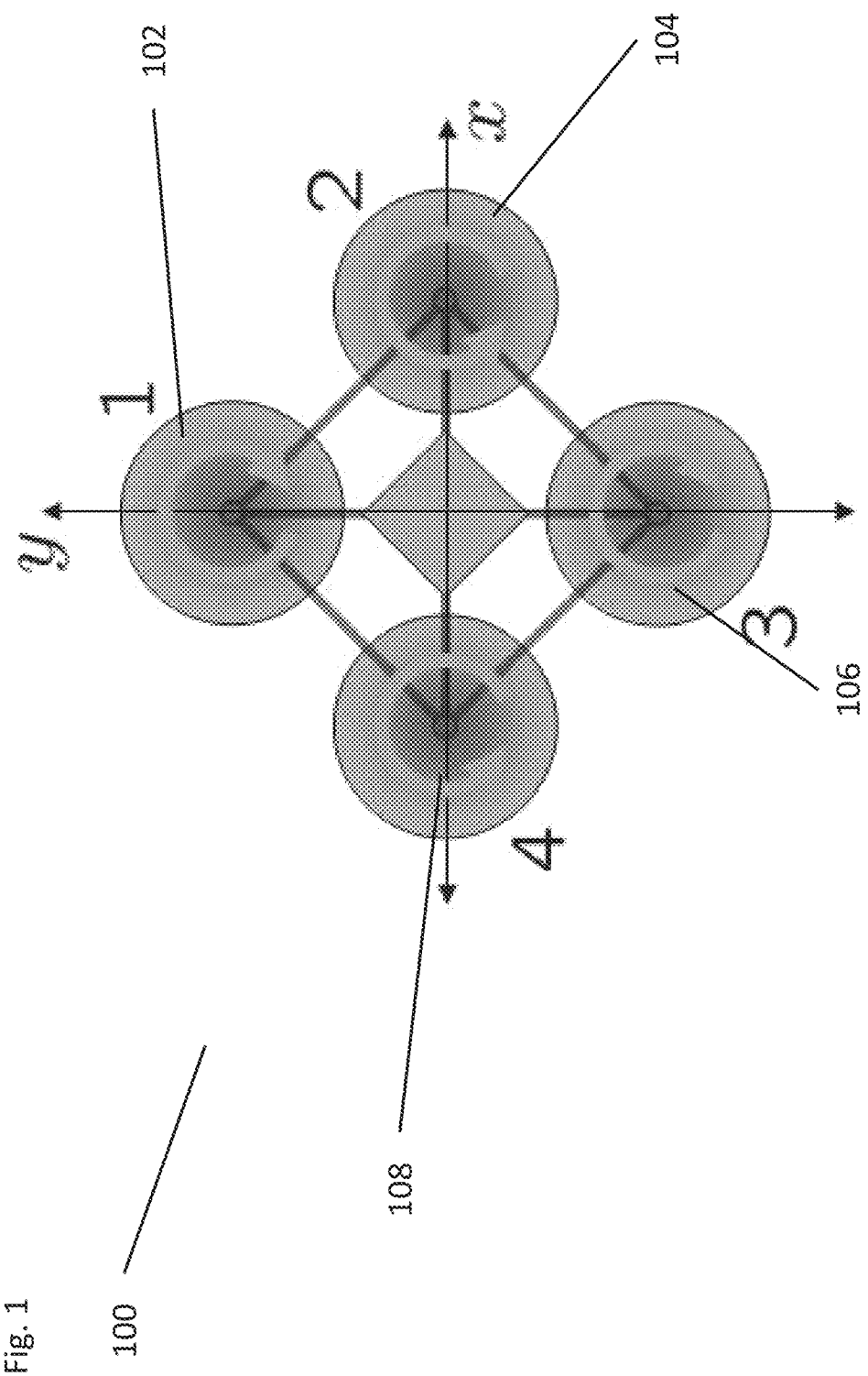
FIG. 1 illustrates a traditional quad copter configuration consistent with known art.

Conventional VTOL and copter type drones tend to use a fixed-pitch approach to rotors. The fixed-pitch approach requires that the rotors be of equal size. As previously mentioned, the conventional flight control is managed through the acceleration/deceleration of one or more of the rotors. For example, FIG. 1 illustrates a conventional layout of a quadcopter 100 with individual rotors 102-108. As can be seen, each of the adjacent rotors are configured to rotate in opposing directions to help balance the torque generated by the rotor. Because all of the rotors are of equal size control methodologies can create various problems. For example, the desired change in moments (roll, pitch, yaw) entails a change in forces (lift, thrust, side force) which can require non-linear relationships that require control software to implicitly decouple the moments from the forces to allow for accurate control of the vehicle. Additionally, more conventional designs inherently account for the torque generated by the rotors by providing an equal and opposite rotor to counter the torque generated.

Some conventional systems also utilize alternative anti-torque mechanisms such as a tail or a complex software that blends commands to other rotors. This results in a complex highly coupled flight control system. By coupled, we are referring to the coupling between rotors and the control of the rotors to generate the movement and moment forces. Furthermore, due to the complexity and coupling of the movements, the control bandwidth is limited by the rate of acceleration/deceleration of the subject rotors. As the vehicle size increases, the control bandwidth become untenably small.

Accordingly, scalability can be limited with more traditional designs creating more complexity in control and design configuration.

The general equation for an aircraft fast-mode (for example, short-period mode) natural frequency, $\omega_n^2$, is:

$$\omega_n^2 = \frac{-0.5 \rho V^2 S c C_{M_\alpha}}{I}$$

Where $0.5 \rho V^2$ is the dynamic pressure, S is the reference area, c is the reference length-scale, $C_{M_\alpha}$ Is the aircraft pitch stiffness, and I is the aircraft moment of inertia concerning the relevant axis. The moment of inertia varies as the fifth power of a length scale. If the linear aircraft dimension is doubled, the moment of inertia increases by a factor of 32. Concomitantly the linear dimension of every rotor is doubled, and every respective rotor's moment of inertia also increases by a factor of 32. Linear dimension rises, of course, only linearly, and the area is quadratic. Assume that dynamic pressure is unaffected, for example, because it is referenced off of rotor tip speed, and tip speed is kept invariant with scale. Thus, the natural frequency of the aircraft, if the scale is doubled, is halved. But the rotor moment of inertia goes up by 32, the bandwidth of the control system is reduced by a factor of 32. This makes the control system 16 times slower, relative to the new natural frequency.

In contrast, many embodiments allow for improved scalability and flight control through an unconventional approach to vehicle design by decoupling the control pitch and yaw from the primary lifting rotors. In accordance the numerous embodiments, an aircraft can be configured with smaller rotors positioned forward and aft of the main lifting rotors that can be used to control the pitch of the vehicle. Although having smaller rotors from the main lifting rotors can create an unbalanced torque in the vehicle, the reduced size rotors can help to decouple or separate the lifting controls from the pitch and yaw controls. This can allow for larger lifting rotors to be configured to make small adjustments resulting in larger more efficient flight controls. Essentially, the decoupling of the controls for pitch, yaw, and roll can simplify the controls of the vehicle because traditional rotor designs would not have to increase or decrease rotational speed in large amounts to make any adjustments in flight control. Beyond the improved and simplified flight controls that decoupling can achieve, the reduced size of auxiliary rotors can also allow for a number of alternative vehicle designs, some of which can be hybrid in nature. Some embodiments may include shrouded rotors or rotors in alternative configurations that can allow for improved scaling of vehicle such that larger more heavy lift capable vehicles can be used.

Figure 2:
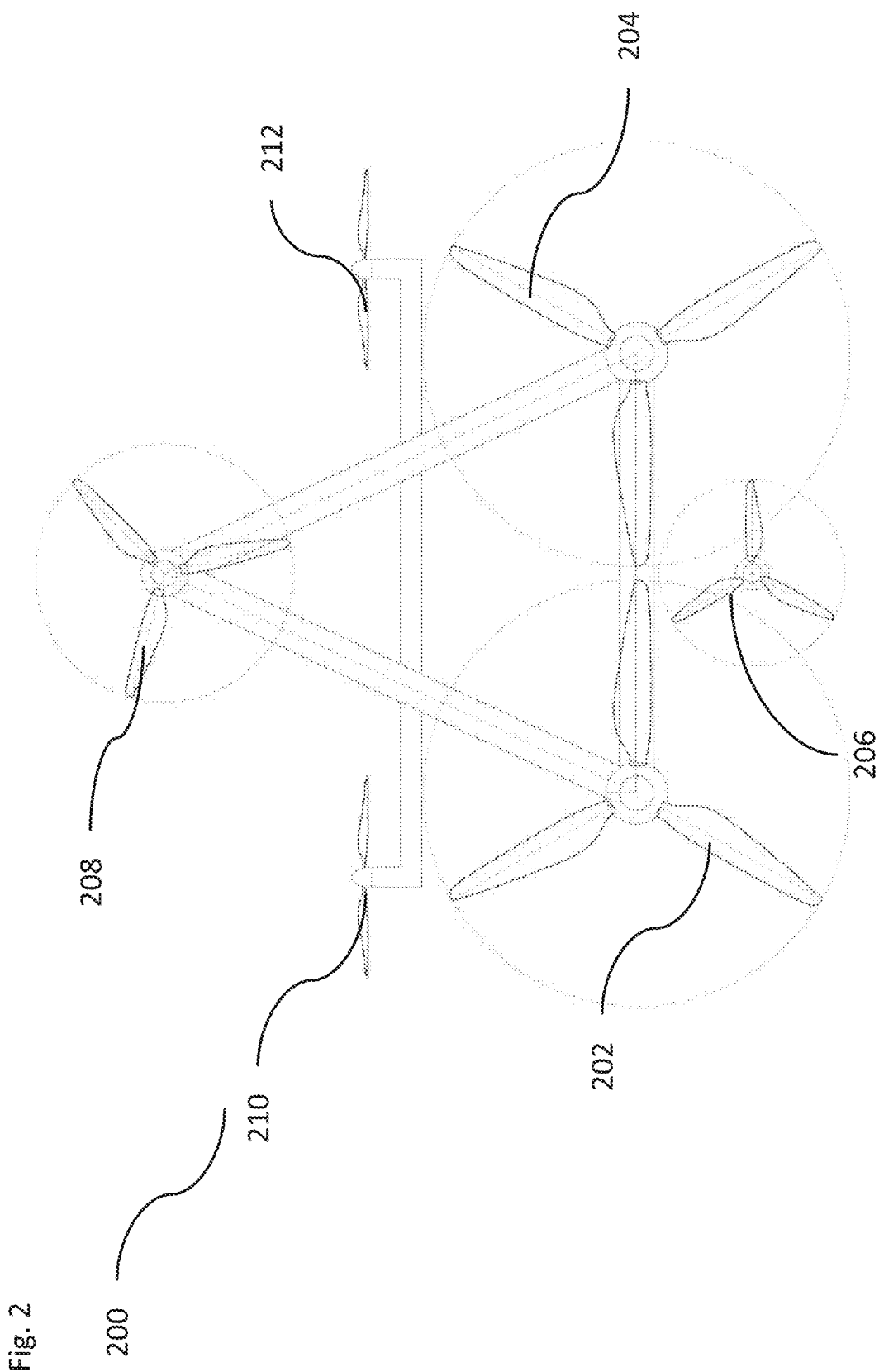
FIG. 2 illustrates a quad copter configuration with asymmetrically sized auxiliary rotors in accordance with embodiments.

Turning now to FIG. 2 a multi-rotor aircraft configuration in accordance with various embodiments is conceptually illustrated. The aircraft 200 can be configured with two primary or main lifting rotors 202 and 204 that are located on opposing sides of a symmetrical plane of the vehicle. In numerous embodiments, the main lifting rotors can be configured to counter rotate or rotate in opposing directions. The counter rotation of opposing rotors is designed to cancel the relative torque that is generated by each rotor. The main lifting rotors 202 and 204 can be configured to be of equal size such that each rotor produces the same amount of torque and subsequently the same amount of lift. This helps to improve the control and is in line with traditional designs.

In contrast to a more traditional design, the aircraft 200 can be configured with a forward 206 and an aft 208 auxiliary rotor. The disposition of having a forward and an Aft rotor can help to reduce the amount of unbalanced torque that could be produced by only one or the other auxiliary rotors. Unbalanced torque can create multiple problems in flight and is a highly undesirable condition in any aircraft. As such many embodiments of the aircraft can be configured to effectively reduce the unbalanced torque through the combination of vehicle configuration and rotor size. As an example, a reduction in size of 20% between the lifting rotors (202 and 204) from the auxiliary rotors can reduce the unbalanced torque as much as 67%. This can also be aided by the position of each of the rotors. In various embodiments, the position of the auxiliary rotors (206 and 208) can vary in relation to the main lifting rotors (202 and 204). For example, as illustrated in FIG. 2, some embodiments of the aircraft may position the forward rotor 206 such that the rotational area overlaps that of the main lifting rotors (202 and 204). Additionally, to counter the torque produced from the forward rotor 206 the rear rotor may be placed outside of the rotational area of the main lifting rotors (202 and 204).

In accordance with many embodiments, the size of the auxiliary rotors (206 and 208) may be smaller than that of the main lifting rotors (202 and 204). While the auxiliary rotors (206 and 208) can still produce lift, their primary function would be to help decouple the pitch and yaw controls from the lifting rotors (202 and 204). As such the small movements in the auxiliary rotors (206 and 208) can help to adjust the pitch of the vehicle 200 during flight. This can subsequently allow the main lifting rotors to then produce some horizontal thrust to propel the vehicle 200 forward or rearward, depending on the pitch angle. As can be appreciated, many embodiments may utilize variable pitched rotors for the auxiliary and/or the main lifters. This can help to further decouple the pitch and yaw controls from the main lifters and allow for smaller and less powerful rotors to be used to produce changes in flight controls. Additionally, as illustrated in FIG. 2, some embodiments of the vehicle 200 can position the auxiliary rotors in locations that would be capable of producing much larger pitch moments with smaller movement. For example, a rotor similar to the aft rotor 208 that is placed further away from the center of gravity of the vehicle would be more capable of generating a change in pitch with much less rotational force due to the moment created from the distance. Therefore, the pitch can be effectively decoupled from the main lifters (202 and 204) without significantly effecting the lift capabilities of the vehicle.

Further illustrated in FIG. 2 and in many other embodiments, the vehicle 200 can be configured with two or more horizontal thrust rotors (210 and 212). In numerous embodiments, the horizontal rotors (210 and 212) can be positioned symmetrically about a central plane of the vehicle and positioned above or below the main lifting rotors. Since a primary function of the vehicle design and rotor configuration is to decouple and simplify controls, it can be appreciated that the horizontal thrusters (210 and 212) can be smaller diameter rotors and still produce sufficient horizontal thrust for the vehicle. This can be due to the fact that the auxiliary rotors (206 and 208) are capable of controlling pitch and allowing the main lifting rotors to translate some of their thrust into horizontal thrust. Thus, the effective thrust can be augmented by the horizontal thrust rotors (210 and 212). In addition to providing horizontal thrust, the thrust rotors (210 and 212) can be used to control the yaw motion of the vehicle. The spinning up or down of one or the other can effectively produce a thrust that would adjust the yaw. This can be an essential element in overall flight control since the movement of an aircraft is ultimately determined in pitch, yaw and roll. As with the smaller auxiliary rotors, smaller horizontal thrusters can be more efficient and can have slight adjustments equate to larger more effective flight controls. As can be further appreciated, many embodiments of the horizontal thrusters (210 and 212) can have variable pitch rotors for improved controls. Although not readily illustrated in FIG. 2, it can be appreciated that each of the pairs of rotors discussed can be configured to be counter rotating. This can be advantageous in reducing the unbalanced torque that is applied as each individual rotor spins.

The use of a smaller auxiliary rotors can offer a large variety of design flexibility with respect to the main rotors and/or the thrust rotors. For example, FIGS. 3A and 3B illustrates an alternative configuration of an aircraft 300 with two main lifting rotors (302 and 304) and two auxiliary rotors (306 and 308). In various embodiments, the position of the rotors is symmetrical about a central axis of the vehicle 300. As can be illustrated, the auxiliary rotors can be equal in diameter and can be configured with counter rotating movement. This helps to cancel their respective torques equally due to the same diameter. Furthermore, the smaller diameter auxiliary rotors help to only produce a nominal amount of thrust differential to allow the horizontal thrusters (310 and 312) to balance and control the yaw of the vehicle. As can be appreciated, the size differential between the main lifters (302 and 304) and the auxiliary rotors (306 and 308) can be adjusted or modified based on the needs of the flight control system. For example, if only small changes in the aircraft center of gravity are expected, the auxiliary rotors can be relatively small, providing quick actuation potential either by traditional acceleration/deceleration or by a variable blade pitch. Alternatively, if larger shifts in the center of gravity can be expected, such as in shifts in cargo, then the auxiliary rotors can be larger and can offer a greater control authority. In some embodiments, the larger auxiliary rotors can utilize a variable collective pitch to control or change the flight of the vehicle 300 while keeping the rotational rate constant. The adaptability of the vehicle can provide a greater range of options from carrying cameras to larger more deliverable cargos.

As can be appreciated, in various embodiments the framework 314 of the vehicle 300 can take on a variety of different shapes in order to accommodate the various payloads that the vehicle will see. Additionally, the framework can be adjusted to employ the various types and sizes of rotors that can help enable the better control methodologies described herein. For example, FIG. 3B illustrated a profile view of an aircraft 300 in which the horizontal thrusters (310 and 312) are supported by angular brackets 320 that extend downward at an angle away from the main structure 322. This can help position the horizontal thrusters outside of any rotational plane of the lifting and auxiliary rotors. As can be appreciated, many embodiments of a vehicle can have any number of different rotor configurations to obtain the desired flight control.

Figure 4:
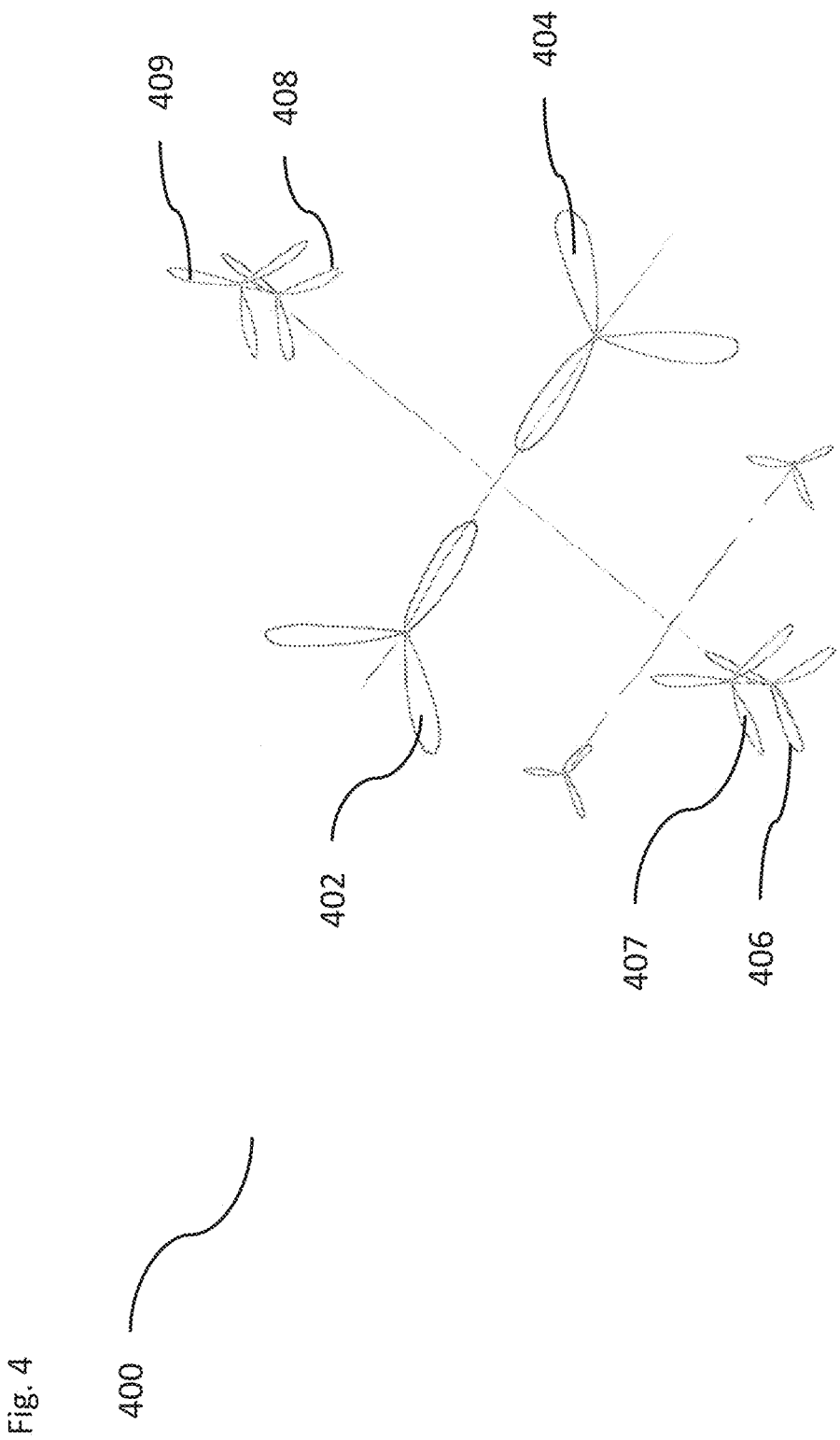
FIG. 4 illustrates a quad copter configuration with coaxial auxiliary rotors in accordance with embodiments.

FIG. 4, for example, conceptually illustrates an embodiment of an aircraft 400 with a rotor configuration similar to that illustrated in FIG. 3A with two main lifting rotors (402 and 404) and symmetrical auxiliary rotors (406-409). In contrast, the auxiliary rotor configuration (406-409) employs a coaxial arrangement of rotors where two rotors are coaxially aligned at the same forward and aft locations. The advantage of utilizing a coaxial arrangement of rotors affords the ability to increase the disk area of the rotors, producing greater control, without increasing the size of the vehicle 400. This can be advantageous when the vehicle 400 needs to remain relatively compact. Additionally, the coaxial alignment of rotors allows the vehicle 400 to retain the small moment of inertia and small torque of the smaller rotor diameter, producing a higher control bandwidth, as well as providing more lifting capabilities by adding to the overall thrust of the vehicle. As can be appreciated, the coaxial rotors (406-409) can have various pitch controls such as variable or collective pitch. For example, in some embodiments of the lower rotors the collective pitch can be adjusted to compensate for the downwash from the upper rotor to keep the blade angle in the most effective and efficient region.

Figure 5:
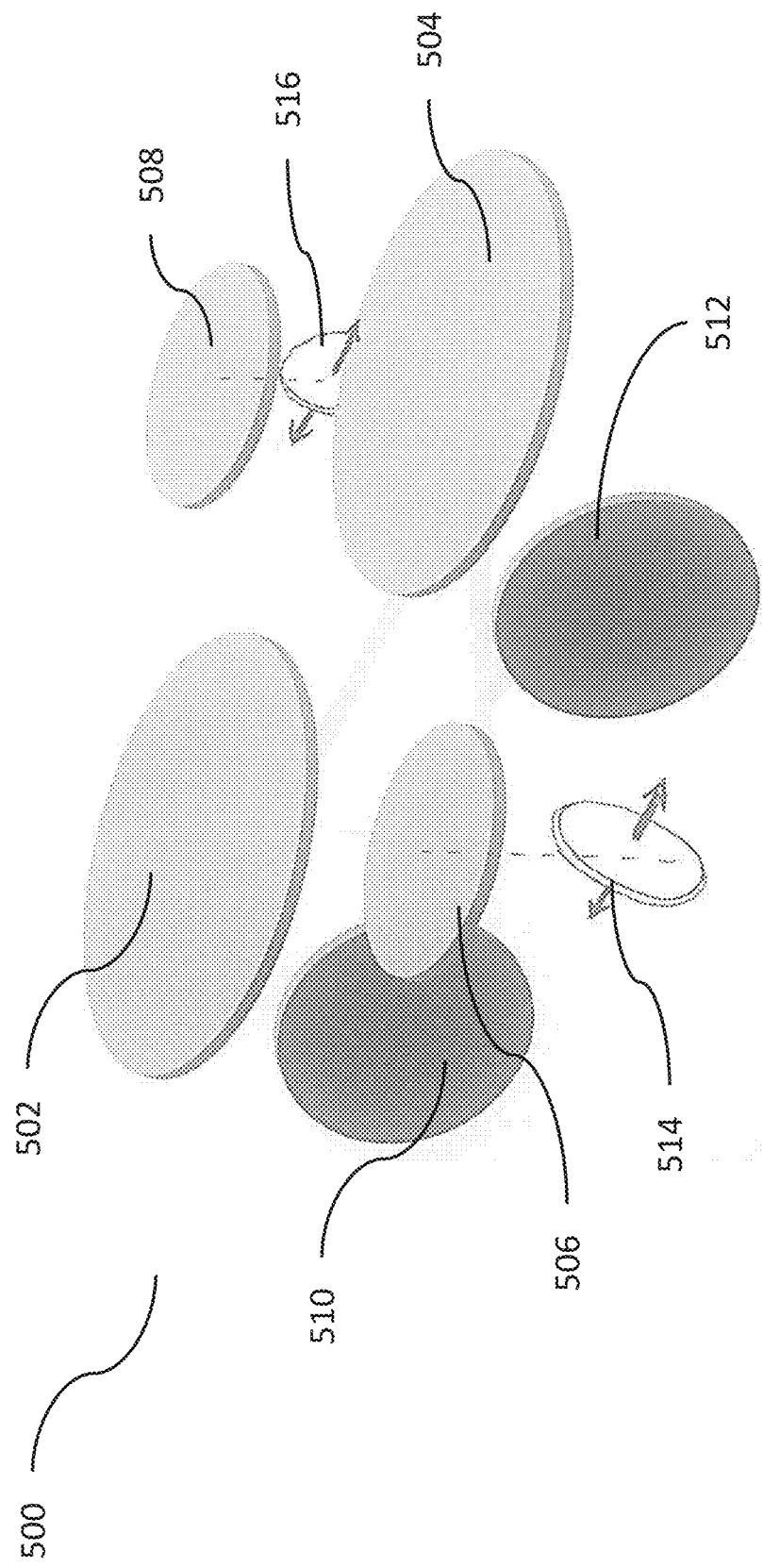
FIG. 5 illustrates a multi-rotor configuration in accordance with embodiments.

Moving on to FIG. 5, the expandability of the various vehicle designs based on the principles of operation discussed herein can be illustrated. For example, FIG. 5 illustrates an embodiment of a vehicle 500 with main lifting rotors (502 and 504) symmetrically about the vehicle central axis and equal in size. Similarly, to other embodiments, the vehicle 500 has two auxiliary rotors (506 and 508) for the decoupling control of the pitch of the vehicle. Additionally, the vehicle 500 can be equipped with horizontal thrusters (510 and 512). The horizontal thrusters (510 and 512) can, similar to other embodiments, be used to alter or control the yaw of the vehicle. However, in some embodiments, the vehicle 500 can be equipped with dedicated yaw control rotors (514 and 516) positioned beneath the auxiliary rotors (506 and 508). Each the dedicated yaw control rotor can be laterally facing thrusters that provide a pure side force through simultaneous rotation or alternating rotation such that the rotation of the rotors (514 and 516) can affect the yaw of the vehicle. As with the use of smaller auxiliary rotors, the dedicated yaw rotors (514 and 516) can help to decouple the yaw control from other rotors that can help improve efficiency and overall controllability of the vehicle.

Figure 6:
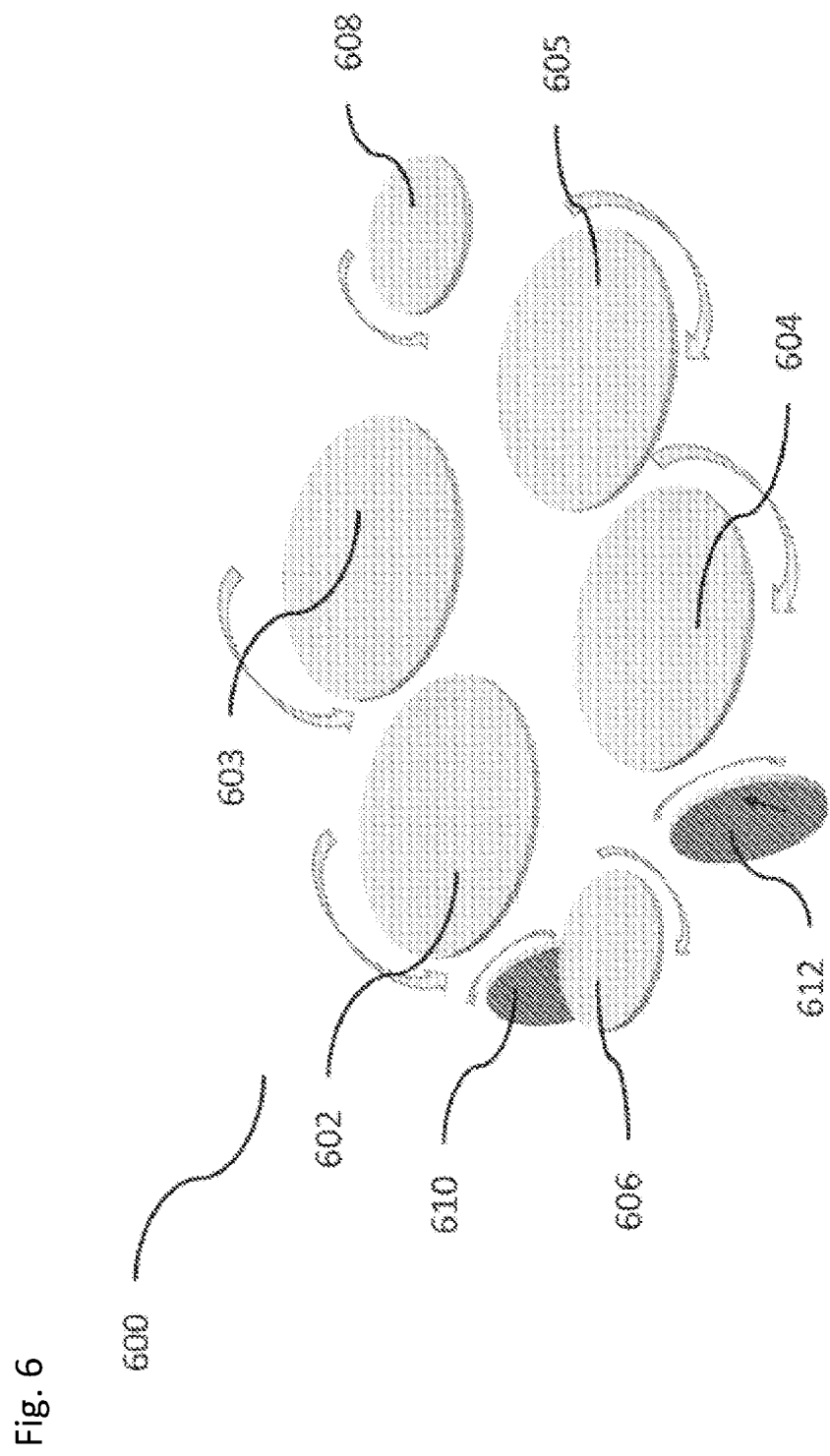
FIG. 6 illustrates a multi-rotor configuration with multiple main lifting rotors in accordance with embodiments.
Figure 7:
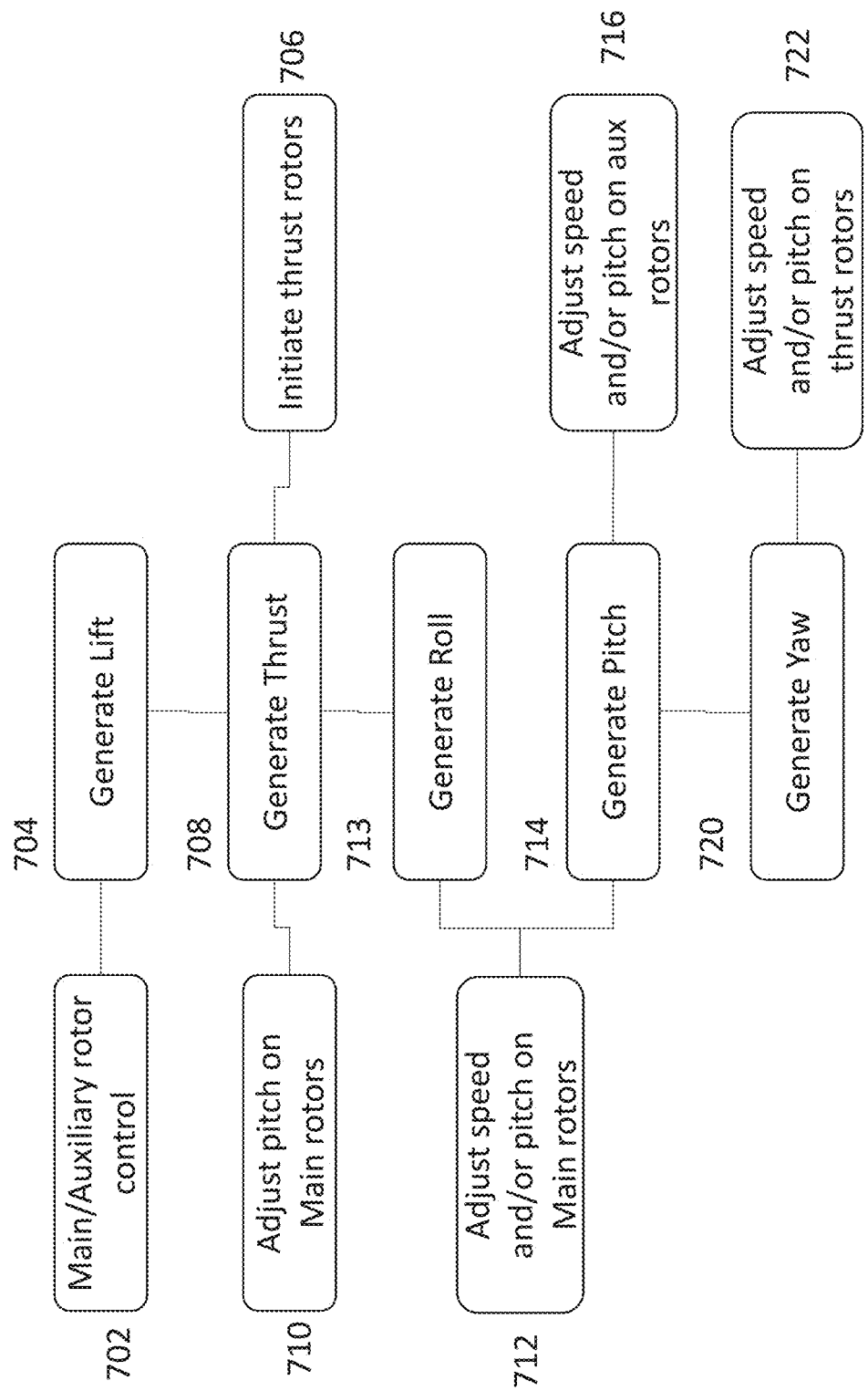
FIG. 7 illustrates a control methodology for yaw control in accordance with embodiments.

Although some embodiments are illustrated with only two main lifting rotors, it should be understood that those only represent a fraction of the number of configurations that can be used under the principles of operations discussed herein. For example, FIG. 6 illustrates an embodiment of an aircraft 600 with four main lifting rotors (602-605) rather than just two. The advantage to having more dedicated lifting rotors expands on the decoupling principle discussed herein. The more dedicated lifting rotors that the vehicle uses the more each of the auxiliary rotors (606 and 608) and horizontal thrusters (610 and 612) can be solely dedicated to each of their respective controls such as pitch and yaw. This subsequently can separate the pitch affect that the various lifting rotors have which can essentially simply the control methodologies and systems involved in the aircraft.

Although many embodiments illustrated herein specifically are directed to the placement and configuration of rotors, it should be understood that such are merely illustrative of the configuration of rotors that can be used and not an entire representation of the vehicle itself. For example, it can be appreciated that the vehicles can have body elements taking on any number of configurations that can carry any type of payload. Additionally, it can be appreciated that the various embodiments of vehicles with various rotor configurations can allow of the incorporation of control systems and computers as well as power systems and power allocation control systems. Such embodiments can include electronic control systems, electronic power systems, and other alternative fuel systems that can be used for power generation. Likewise, many embodiments may have a number of different mechanical linkages that can help to control or adjust the pitch of the rotors. Additionally, some embodiments may incorporate a number of different shroud designs to encapsulate the various components while others may have an open skeletal structure.

Although the primary principle of operation is to improve control characteristics of a vehicle through unconventional design layouts with decoupling of movement controls, many embodiments may implement a variety of other control measures to help improve the overall control of the vehicle. For example, in a number of embodiments each of the rotors can have a fixed pitch or a variable pitch. The variable pitch of the individual rotors can help improve the overall flight characteristics in a number of ways. For example, the thrust rotors can utilize variable pitch to more accurately control the yaw and/or unbalanced torque produced from the auxiliary rotor. Likewise, the main rotors can utilize variable pitch designs to improve lift, thrust, pitch, and/or roll of the vehicle. Therefore, it can be appreciated that any balanced configuration of fixed-pitch and variable pitched rotors can be used to control the movement and moments of the aircraft.

The method of control of a multi-rotor aircraft can vary depending on the desired movement of the vehicle. Accordingly, the various rotors can be moved in a number of combinations to control the aircraft. For example, FIG. 6 illustrates a control methodology for flying an aircraft with fixed and or variable pitch rotors. Generally, the main rotors and auxiliary rotor are spun up (702) to generate lift (704). Subsequently the thrust rotors can be spun up (706) to generate a forward thrust (708). In correlation with the thrust rotors, the main rotors can provide additional forward thrust through a pitch adjustment (710). If flight paths and/or obstacles require the use of a roll technique, the speed and/or pitch of the main rotors can be adjusted (712) to control the roll of the vehicle 613. The pitch of the vehicle can be controlled (714) by either the movement of the auxiliary rotor (716) and/or the movement of the main rotors (712). As can be appreciated in a fixed pitch configuration the speed can be adjusted and in a variable pitch configuration the speed and/or pitch can be adjusted on the various rotors to control the pitch as well as other movements. Similar to the thrust, roll, and pitch, yaw control (720) can be done through the control of the thrust rotors (722). The thrust rotors (722) can adjust the speed and/or pitch to generate a yaw moment in the aircraft and thereby change direction.

SUMMARY & DOCTRINE OF EQUIVALENTS

As can be inferred from the above discussion, the above-mentioned concepts can be implemented in a variety of arrangements in accordance with embodiments of the invention. Specifically, the use of a configuration of rotors that decouples the controls from each set of rotors in order to simplify the control system. Additionally, a number of embodiments incorporate additional smaller thrust rotors to generate thrust and/or yaw control of a vehicle.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A multi-rotor vehicle comprising:
   a body structure,
   a plurality of main rotors connected to the body structure and evenly disposed about a symmetry plane of the vehicle, the plurality of main rotors configured for rotation about a rotational plane,
   a first set of auxiliary rotors connected to the body structure, each of the auxiliary rotors configured for rotation about a plane that is parallel to the rotational plane of the plurality of rotors,
   where one of the first set auxiliary rotors is disposed forward of the plurality of main rotors along the symmetry plane and where one of the first set auxiliary rotors is disposed aft of the plurality of main rotors along the symmetry plane, wherein each rotor of the first set auxiliary rotors is configured to be smaller than each of the plurality of main rotors and wherein each of the rotors of the first set of auxiliary rotors are configured to control a pitch moment of the vehicle;
   at least two horizontal thrust rotors connected to the body structure and evenly disposed about the symmetry plane and configured to generate thrust in a forward direction such that a rotational plane of the at least two horizontal thrust rotors is perpendicular to the rotational plane of the plurality of main rotors; and
   wherein the first set auxiliary rotors are asymmetrically disposed about a transverse plane such that one of the first set auxiliary rotors is disposed further from the main rotors than the other of the first set auxiliary rotors.

2. The multi-rotor vehicle of claim 1, wherein the body structure is a plurality of elongated structural support elements and disposed such that at least one structural support element interconnects at least two main rotors and additional structural support elements interconnect the main rotors to the first set auxiliary rotors.

3. The multi-rotor vehicle of claim 1, wherein the at least two horizontal thrust rotors are positioned aft of the main rotors.

4. The multi-rotor vehicle of claim 1, wherein the plurality of main rotors is selected from a group consisting of 2, 4, and 6 rotors.

5. The multi-rotor vehicle of claim 1, wherein one of the first set auxiliary rotors is positioned such that a rotational space of the rotor overlaps a rotational space of the plurality of main rotors.

6. The multi-rotor vehicle of claim 1, further comprising a shroud, wherein the shroud surrounds at least a portion of the main rotors and the auxiliary rotors of the vehicle.

7. The multi-rotor vehicle of claim 1, wherein each of the main rotors, auxiliary rotor, and the at least two thrust rotors are selected from a group consisting of fixed pitch and variable pitch.

8. The multi-rotor vehicle of claim 1, further comprising at least two dedicated yaw control rotors, where each of the at least two dedicated yaw control rotors are disposed beneath each of the at least two auxiliary rotors such that each of the dedicated yaw control rotors are configured to control a yaw moment of the vehicle.

9. The multi-rotor vehicle of claim 1, further comprising a second set of auxiliary rotors that are coaxially aligned with the first set of auxiliary rotors.

10. The multi-rotor vehicle of claim 1, wherein each rotor of the first set auxiliary rotors is configured to be smaller than each of the plurality of main rotors.

11. The multi-rotor vehicle of claim 1, wherein at least the plurality of main rotors are configured for both speed adjustment and pitch adjustment for controlling forward thrust and/or rolling movement of the multi-rotor vehicle.

12. The multi-rotor vehicle of claim 1, wherein the at least two horizontal thrust rotors are positioned beneath the plurality of main rotors and configured for collective pitch adjustment.

13. The multi-rotor vehicle of claim 1, wherein the at least two horizontal thrust rotors can be used to affect a yaw moment in the vehicle through adjusting a rotational speed of each of the at least two horizontal thrust rotors.

14. The multi-rotor vehicle of claim 13, wherein the at least two horizontal thrust rotors are disposed on a first and second end of a transecting structural element, wherein the transecting structural support element transects at least two elongated structural support elements of the body structure.

15. A multi-rotor vehicle comprising:
    a body structure,
    a plurality of main rotors connected to the body structure and evenly disposed about a symmetry plane of the vehicle,
    a first set of auxiliary rotors connected to the body structure where one of the first set auxiliary rotors is disposed forward of the plurality of main rotors along the symmetry plane and where one of the first set auxiliary rotors is disposed aft of the plurality of main rotors along the symmetry plane, wherein each rotor of the first set auxiliary rotors is configured to be smaller than each of the plurality of main rotors and wherein each of the rotors of the first set of auxiliary rotors are configured to control a pitch moment of the vehicle,
    at least two horizontal thrust rotors connected to the body structure and evenly disposed about the symmetry plane and configured to generate thrust in a forward direction such that a rotational plane of the at least two horizontal thrust rotors is perpendicular to a rotational plane of the plurality of main rotors; and
    at least two dedicated yaw control rotors, where each of the at least two dedicated yaw control rotors are disposed beneath each of the at least two auxiliary rotors such that each of the dedicated yaw control rotors are configured to control a yaw moment of the vehicle.

16. The multi-rotor vehicle of claim 15, wherein the at least two horizontal thrust rotors can be used to affect a yaw moment in the vehicle through adjusting a rotational speed of each of the at least two horizontal thrust rotors.

17. The multi-rotor vehicle of claim 15, wherein the body structure is a plurality of elongated structural support elements and disposed such that at least one structural support element interconnects at least two main rotors and additional structural support elements interconnect the main rotors to the first set auxiliary rotors.

18. The multi-rotor vehicle of claim 15, wherein the at least two horizontal thrust rotors are positioned aft of the main rotors.

19. The multi-rotor vehicle of claim 15, wherein each of the main rotors, auxiliary rotor, and the at least two thrust rotors are selected from a group consisting of fixed pitch and variable pitch.

\* \* \* \* \*